Sept. 12, 1950      B. W. KEESE      2,521,729
PROPULSION AND POWER TAKE-OFF GEARING FOR VEHICLES
Filed Dec. 11, 1945      3 Sheets-Sheet 1
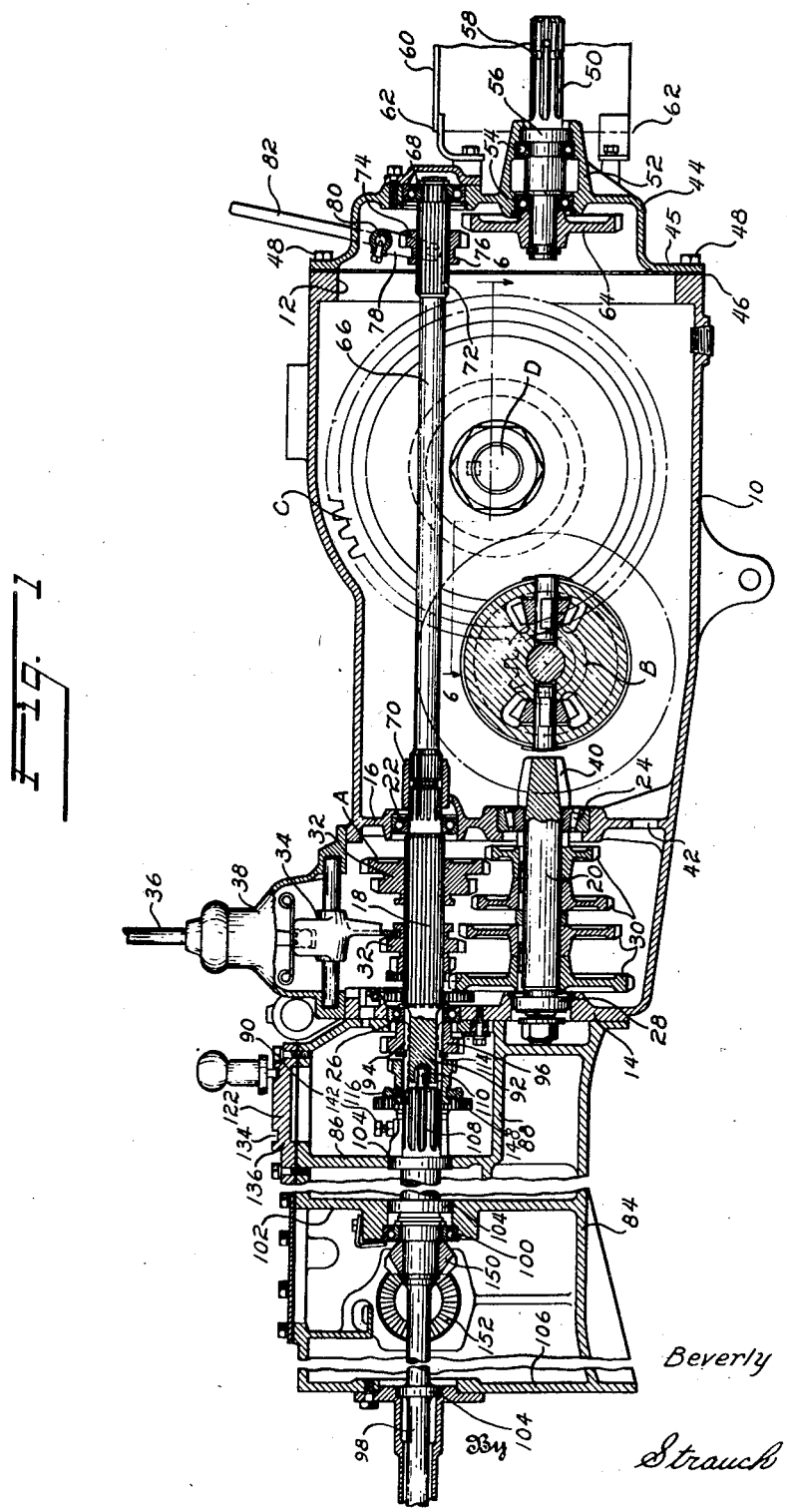
Inventor
Beverly W. Keese
By Strauch & Hoffman
Attorneys Sept. 12, 1950      B. W. KEESE      2,521,729
PROPULSION AND POWER TAKE-OFF GEARING FOR VEHICLES
Filed Dec. 11, 1945      3 Sheets-Sheet 2
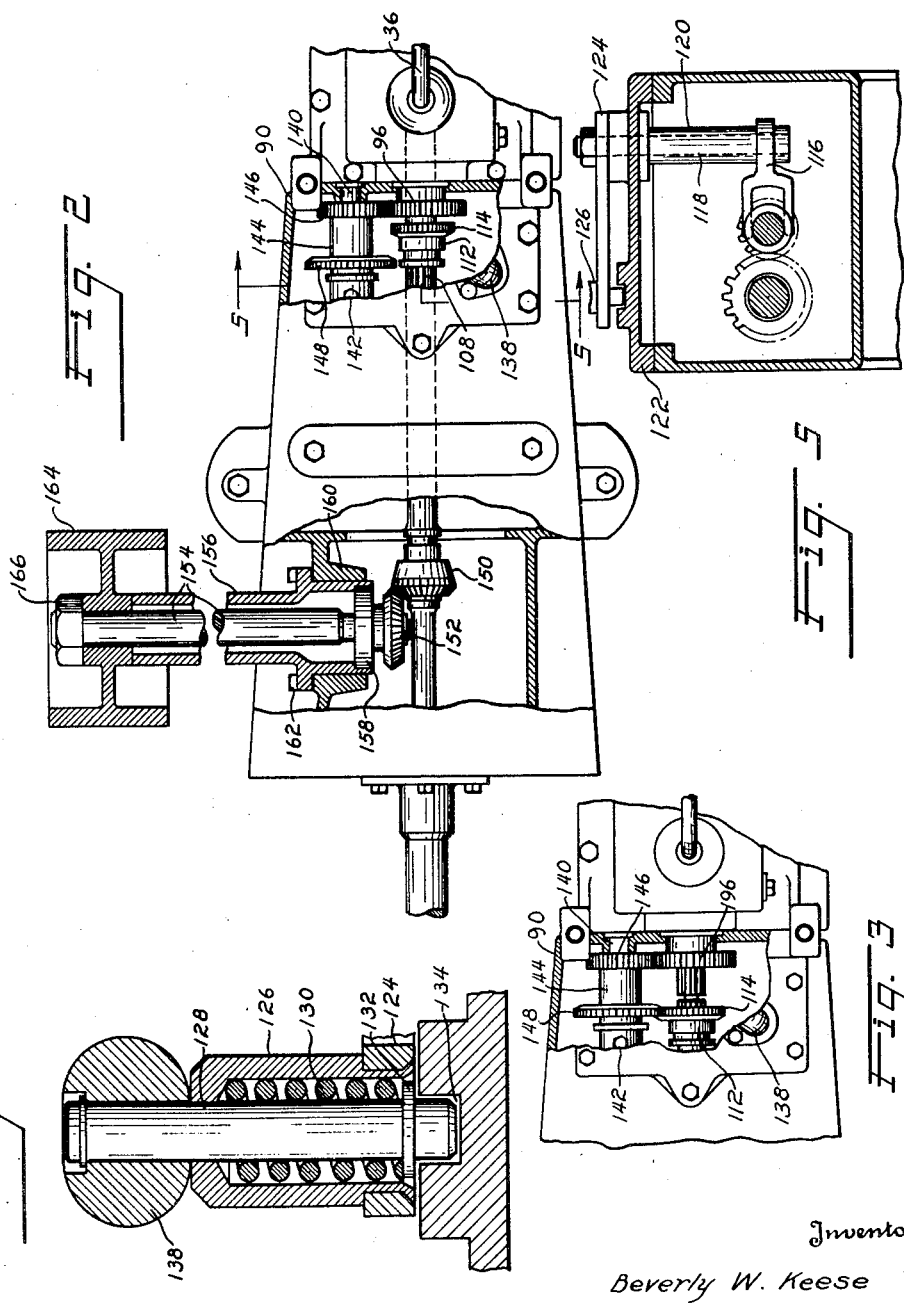
Inventor
Beverly W. Keese
By Strauch & Hoffman
Attorneys Sept. 12, 1950     B. W. KEESE     2,521,729
PROPULSION AND POWER TAKE-OFF GEARING FOR VEHICLES
Filed Dec. 11, 1945     3 Sheets-Sheet 3

Inventor
Beverly W. Keese

By Strauch & Hoffman
Attorneys

Patented Sept. 12, 1950

2,521,729

UNITED STATES PATENT OFFICE 2,521,729

PROPULSION AND POWER TAKE-OFF GEARING FOR VEHICLES

Beverly W. Keese, Oshkosh, Wis., assignor to The Timken-Detroit Axle Company, Detroit, Mich., a corporation of Ohio Application December 11, 1945, Serial No. 634,180

2 Claims. (Cl. 74—700)

This invention relates to power take-off means for vehicle drive mechanism which is particularly adapted for use in connection with farm tractors and similar motor driven vehicles.

It is one of the objects of the present invention to provide a power take-off unit as an optional accessory, carried by a cover adapted to be detachably bolted to a rear open end of the housing for the final axle drive gearing and embodying means for transmitting power to said unit from the input shaft of the variable speed transmission unit of the vehicle driving mechanism.

It is another object of the invention to provide an improved mounting and arrangement of the power take-off shaft and the driving shaft therefor in parallel relation and with their axes disposed respectively below and above the plane of the vehicle axle so that a comparatively low center of gravity is obtained.

Another object of the invention resides in the provision of a manually shiftable clutch member for releasably establishing a driving connection between the forward end of the transmission input shaft and the rear end of the motor driven shaft, together with means including said clutch member for selectively establishing a variable speed driving connection through the transmission input shaft between the power take-off device and the motor driven shaft.

A further object of the invention is to provide speed reduction gearing in advance of the transmission, operative when the vehicle is stationary to drive the transmission shaft from the motor shaft at relatively low speed, together with additional speed reduction gearing embodied in the power take-off unit to further reduce the operating speed of the power take-off shaft for the operation of a hay baler or other auxiliary machine.

Still another object of the invention resides in the provision of a second power take-off unit in advance of the transmission having a power take-off shaft disposed at right angles to the motor driven shaft and directly geared thereto.

Finally, it is the general object and purpose of the present invention to provide power take-off means for motor driven vehicles as above characterized, in which the several cooperating mechanical parts are of simple and rugged structural form and embodied in an efficiently operating, compact space conserving organization.

With the above and other objects in view, the invention comprises the improved power take-off means for vehicle drive mechanism and the construction and relative arrangement of the several parts thereof, as will hereinafter be more fully described, illustrated in the accompanying drawings and subsequently incorporated in the subjoined claims.

In the accompanying drawings wherein I have illustrated one practical embodiment of the invention and in which similar reference characters designate corresponding parts throughout the several views:

Figure 1 is a vertical longitudinal sectional view showing one embodiment of the present invention as applied to a typical farm tractor drive mechanism;

Figure 2 is a plan view partly in section showing the inoperative condition of the speed reducing gearing between the motor driven shaft and the transmission input shaft;

Figure 3 is a horizontal sectional view showing the operative condition of said gearing to transmit power at low speed to the transmission input shaft;

Figure 4 is an enlarged detail sectional view of the means for latching the shiftable clutch gear in position to drive the transmission input shaft at high or low speed;

Figure 5 is a detail vertical sectional view taken substantially on the line 5—5 of Figure 2.

Figure 6:
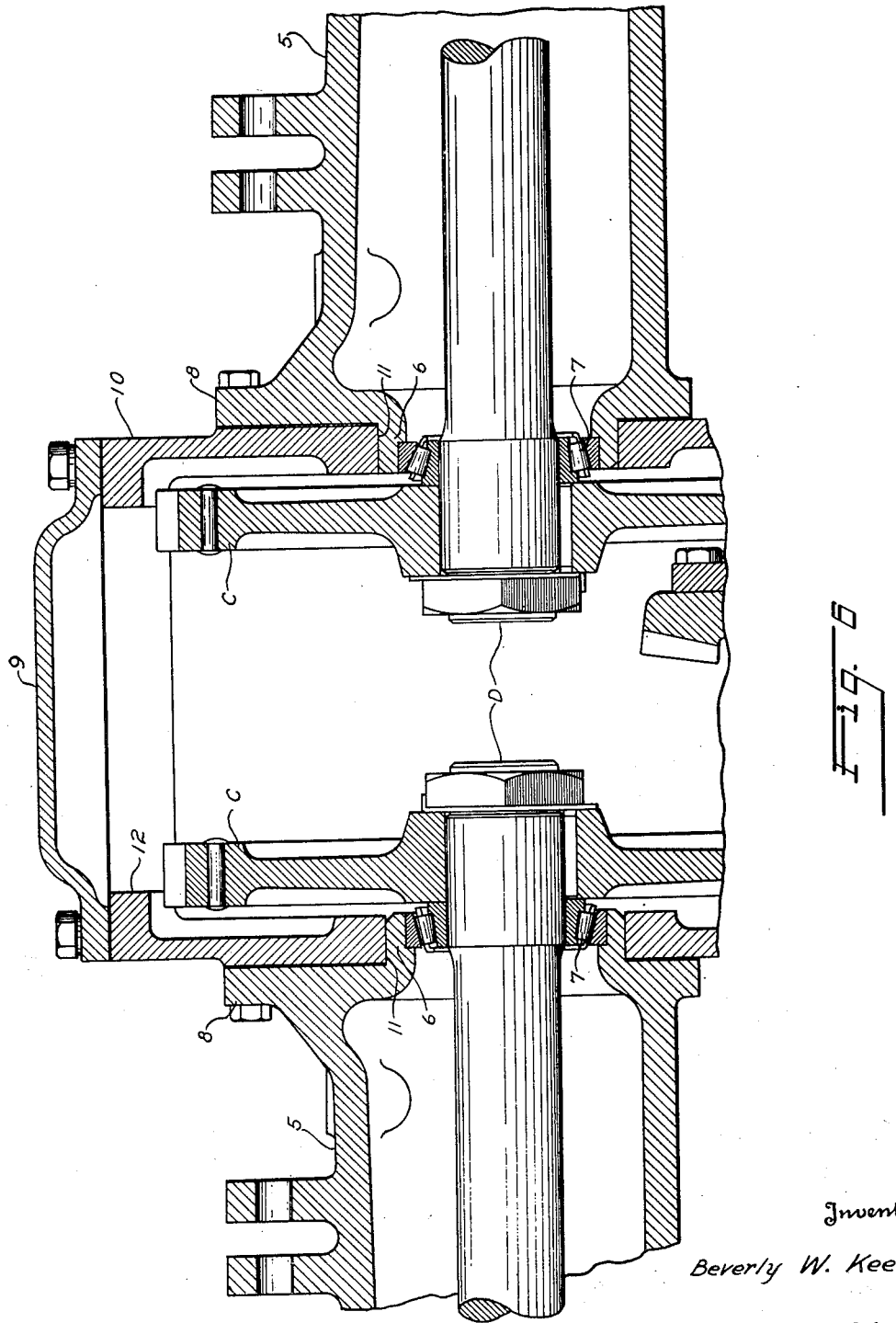
Figure 6 is a horizontal sectional view taken substantially on the line 6—6 of Figure 1.

Referring in further detail to the drawings, the vehicle drive mechanism includes the usual power transmission unit A, differential unit B and final drive gearing C for the wheel axles, as indicated at D. This drive mechanism is enclosed within a suitable housing structure 10 having a rear open end 12.

As shown in Figure 6, the axle arms or casings 5, which are of properly selected length in accordance with the desired wheel track width, are provided at their inner ends with bosses 6 fitting in openings 11 in opposite side walls of the housing 10. Anti-friction bearings 7 are mounted in these bosses in which the respective axles D are journaled. Adjacent to the boss 6 each axle arm is provided with a flange 8 rigidly bolted to the side wall of the housing.

In spaced relation to its front end wall 14, the housing structure 10 is provided with a vertically disposed internal wall 16, in which the rear ends of the transmission input shaft 18 and the output shaft 20 are journalled in suitable bearings indicated at 22 and 24, respectively. Similarly, the forward ends of said shafts are journalled in the bearings 26 and 28 mounted in the front end wall 14 of the housing. Thus, the housing walls 14 and 16 provide a separate compartment for the variable speed transmission gearing which includes a series of gear elements 30 of relatively different diameters fixed to the output shaft 20 and with which the elements of the gear clusters 32 splined upon the power input shaft 18 are adapted to be selectively engaged by the operation of selector mechanism generally indicated at 34 actuated by the manually operable shift lever 36 mounted in the turret casting 38 which closes the upper end of the transmission compartment. The rear end of the power output shaft 20 is provided with the usual drive pinion 40 meshing with the ring gear of the differential unit B.

It will be noted that the axes of the transmission output shaft 20 and the main shaft of the differential unit B are disposed in a common horizontal plane below the wheel axles D while the axis of the power input shaft 18 is located above the plane of said wheel axles. The lower end of the housing wall 16 is provided with one or more openings 42 through which lubricating oil may freely flow to maintain a common oil bath level in the transmission compartment and the compartment containing the differential and the final axle drive gearing.

As the transmission unit and speed selecting mechanism is fully described in my pending application for patent filed March 1, 1944, Serial No. 524,600, further detailed reference thereto is unnecessary for the purpose of the present application.

The rear open end 12 of the housing structure 10 is adapted to be closed by the cover member 44, said member having an attaching flange 45 between which and the end face of the wall of housing 10 a suitable packing or sealing strip 46 is interposed, said cover member being detachably secured in assembled relation with the housing by suitable bolts 48.

The housing member 44 carries a power take-off unit which comprises the power take-off shaft 50 journalled in spaced bearings 54 mounted in the opposite ends of a boss 52 formed on the wall of the cover member 44, a conventional oil seal 56 being mounted in the boss 52 at the outer side of the outer shaft bearing 54. The outer or rear of the take-off shaft 50 is splined as at 58 for connection by suitable coupling means (not shown) with the drive shaft for an auxiliary machine. A protecting hood 60 for this coupling is preferably provided and carries bracket elements 62 securely bolted to the cover member 44. The inner or forward end of the take-off shaft 50 is of reduced diameter and to the same the large spur gear 64 is suitably fixed. It will be noted that the power take-off shaft is also located below the horizontal plane of the wheel axles D.

The power take-off driving shaft 66 has its rear end journalled in a bearing 68 mounted in the wall of the cover member 44. This driving shaft extends horizontally above the wheel axles D and its forward end is splined and detachably coupled to the splined rear end of the transmission input shaft 18 by means of the internally splined coupling sleeve 70.

The rear end of the shaft 66 is also splined at 72 and upon the same an internally splined pinion 74 is mounted for axial movement into and out of meshing relation with the spur gear 64 on the power take-off shaft 50. The pinion is provided with a grooved collar 76, in opposite sides of which suitably swiveled rollers or trunnions on the ends of the arms of a fork 78 are engaged, said fork being fixed to the shaft 80 journalled in suitable bearings on opposite side walls of the cover member 44 and having the operating lever 82 fixed to one end thereof.

To the front end wall 14 of the housing 10, the rear end wall of a separate housing structure 84 is rigidly secured. Adjacent the transmission unit, this housing structure is internally divided by means of the vertical and horizontal webs 86 and 88 to form the compartment 90 which receives a forwardly extending end portion 92 of the transmission input shaft 18. This shaft extension is externally splined as at 94 to receive the internally splined gear 96 having a hub extension engaging the bearing 26 for the transmission input shaft 18. Suitable means is provided for locking the gear 96 against forward axial movement on the shaft extension 92.

The rear end of the motor driven shaft 98 is journalled in the bearing 100 mounted in the internal wall 102 of housing structure 84 which is forwardly spaced from the compartment 90, said shaft extending through suitable oil seals 104 in the walls 86 and 102 and the front end wall 106 of the housing structure 84.

The rear end of the power driven shaft 98 extending into the compartment 90 is splined as at 108 and provided with a reduced axial extension 110 mounted in a pilot bearing in the end 92 of the transmission input shaft 18. An internally splined clutch sleeve 112 is axially movable on the splined ends 92 of the transmission input shaft and 108 of the motor driven shaft 98. This sleeve at the end thereof adjacent gear 96 is formed with a pinion 114 of relatively small diameter and at its other end is provided with an external groove to receive the arms of fork 116 on the lower end of the vertical rod or shaft 118, mounted in sleeve 120 depending from the cover plate 122 which closes the upper side of the compartment 90. To the upper end of the shaft 118 one end of the horizontally disposed arm 124 is suitably attached. The other end of this arm is provided with a vertically disposed, hollow guide member 126 for latch pin 128 which is urged downwardly by means of spring 130 bearing at its lower end upon the collar 132 to said pin and yieldingly holding the lower end of the pin in one of the spaced notches or recesses 134 provided in the upstanding rib 136 formed on the cover plate 122. The upper end of the pin 128 has fixed thereto a knob or other suitable hand piece 138 by means of which the latch pin 128 may be lifted against the action of spring 130 and its lower end disengaged from the notch 134.

In transversely spaced relation to the opposed ends of the transmission input shaft 18 and the motor driven shaft 98, a shaft 140 is mounted at its opposite ends in suitable bearings on the front and rear walls of the compartment 90 and is rigidly fixed against rotative movement by means of a suitable set screw 142 mounted in one of said bearings, as seen in Figure 3 of the drawings. Upon this shaft, a sleeve 144 is journalled by means of roller bearings 145 mounted in the opposite ends of said sleeve. One end of this sleeve is provided with a gear 146 of substantially the same diameter as the gear 96 with which it is in constant mesh, while the other end of said sleeve is provided with relatively large diameter gear 148.

As thus far described, it will be seen that, when the coupling sleeve 112 is in the position shown in Figures 1 and 2 of the drawings, power is transmitted from the motor driven shaft 98 to the input shaft 18 of the transmission and the power take-off drive shaft 66 at engine speed. When gear 74 is shifted into engagement with gear 64, power will then be transmitted at a reduced speed to the power take-off shaft 50 for the operation of an auxiliary machine connected therewith, it being understood that the transmission selector mechanism is in neutral position and the vehicle is stationary. When it is desired to transmit power to the take-off shaft 50 at a still lower speed, as in the operation of a hay baler or similar machine, the clutch member 112 is shifted to the left from the position shown in Figures 1 and 2 by disengaging the latch pin 128 from one of the recesses 134 to operate the clutch shifting fork 116, and then releasing said latch pin to engage the same in the other recess 134, at which time the internal splines of said clutch member are disengaged from the splined end 92 of shaft 18 and the gear 114 of said clutch member is in meshing engagement with the gear 148. Shaft 18 and power take-off driving shaft 66 will then be driven by the gears 146 and 96 at a reduced speed relative to the speed of the engine driven shaft 98. The gears 74 and 64 provide a second speed reduction whereby the power take-off shaft 50 will be driven at a lower speed than the driving shaft 66. The operation of the auxiliary machine may be interrupted at any time by operating the lever 82 to shift the gear 74 out of mesh with gear 64.

In advance of the housing compartment 90, a second power take-off device is provided which is adapted to be operatively connected with an accessory carried by the vehicle to operate the same when the vehicle is in motion or stationary directly from the motor driven shaft 98. As shown, this device includes the bevel gear 150 directly fixed to shaft 98 in any suitable manner adjacent the bearing 100 and in constant mesh with a similar gear 152 on the inner end of the power take-off shaft 154. This shaft is journalled at its opposite ends in suitable bearings 158 mounted in opposite ends of the sleeve 156 having one end thereof fitted within an internally projecting boss 160 formed on one side wall of the housing 84 and rigidly secured to said wall by bolts 162. To the outer end of the shaft 154, a pulley 164 is keyed and secured thereon against axial movement by the nut 166 threaded upon the reduced end of said shaft.

From the foregoing description, it will be seen that I have provided a very simple power take-off device which may be sold as an optional unit and readily mounted upon the rear end of the axial housing and selectively operated from the transmission input shaft of the machine at either one of two relatively low speeds for the operation of various kinds of auxiliary machines. This unit may of course be easily removed, together with the driving shaft 66 therefor, when its use is not required and the rear open end 12 of the axle housing closed by means of a conventional cover plate 9 as shown in Figure 6 of the drawings. It will also be noted that the mounting of this power take-off unit on the axle housing with the power take-off shaft 50 disposed below the plane of the wheel axles provides a more or less balanced weight distribution and a comparatively low center of gravity.

The first speed reduction unit for driving the transmission input shaft 18 at different speeds is of simple and compact construction, occupying little space within the housing structure 84, and may be easily and quickly operated to directly connect the motor driven shaft with said transmission shaft 18 or disconnect the same therefrom and indirectly rotate said shaft at a lower speed through the speed reduction gearing. Therefore, together with the second speed reduction gearing incorporated in the power take-off unit on the rear end of the axle housing, I have provided a comparatively inexpensive and efficiently functioning organization for the operation of various kinds of auxiliary machines at the required speed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Vehicle drive mechanism comprising a housing containing a variable speed transmission and differential and final drive mechanism in longitudinal succession, said transmission having an output shaft connected to said differential and final drive mechanism and having an input shaft at a higher level, an engine driven shaft in the forward part of said housing, said transmission input and engine driven shafts having adjacent splined end portions piloted one within the other, a gear fixed to said transmission input shaft rearwardly of its splined end portion, axially spaced gears mounted for rotation together on an axis parallel to the engine driven shaft, one of said spaced gears being constantly meshed with said gear on the transmission input shaft, and a gear slidably mounted on the splined end of said engine driven shaft adapted in one position to bridge said splined shaft end portions for driving said transmission input shaft directly from said engine driven shaft, and adapted in another position to be clear of the splined end of the transmission input shaft and mesh with the other of said spaced gears so as to drive said transmission input shaft in other than direct drive.

2. Vehicle drive mechanism comprising a housing containing a variable speed transmission and differential and final drive mechanism in longitudinal succession, said transmission having spaced input and output shafts, a cover member closing the rear end of said housing, a power take-off shaft journaled in said cover member, an engine driven shaft in the forward part of said housing mounted coaxially with said transmission input shaft, said engine driven and transmission input shafts having their adjacent ends piloted one within the other and provided with corresponding splined portions, a gear fixed to said transmission input shaft rearwardly of its splined end portion, axially spaced gears mounted for rotation together on an axis parallel to said engine driven shaft, one of said spaced gears being constantly meshed with the gear on said transmission input shaft, and a gear slidably mounted on the splined end of said engine driven shaft adapted in one position to bridge said splined shaft end portions for driving the transmission input shaft directly from said engine driven shaft, and adapted in another position to be clear of the splined end of the transmission input shaft and mesh with the other of said spaced gears so as to drive the transmission input shaft in other than direct drive, a power take-off drive shaft extending through said housing, means coupling said power take-off drive shaft at its forward end to said transmission input shaft, means journaling the other end of said power take-off drive shaft in said cover, and a separable drive connection between said power take-off drive shaft and said power take-off shaft.

BEVERLY W. KEESE.

REFERENCES CITED

The following references are of record in the file of this patent:

UNITED STATES PATENTS

| Number | Name | Date |
|---|---|---|
| 1,391,294 | Barbarou | Sept. 20, 1921 |
| 1,559,617 | Johnston | Nov. 3, 1925 |
| 1,645,224 | Brown | Oct. 11, 1927 |
| 1,849,144 | Hamilton | Mar. 15, 1932 |
| 1,961,809 | Wood | June 15, 1934 |
| 1,982,727 | Eberhardt | Dec. 4, 1934 |
| 1,990,209 | Schoenrock | Feb. 5, 1935 |
| 2,022,762 | Ferguson | Dec. 3, 1935 |
| 2,140,687 | Brown | Dec. 20, 1938 |
| 2,169,440 | Weiss | Aug. 15, 1939 |
| 2,192,078 | Hautzenroeder | Feb. 27, 1940 |
| 2,241,002 | Peterson | May 6, 1941 |
| 2,244,225 | Strehlow | June 3, 1941 |
| 2,245,078 | Padgett | June 10, 1941 |
| 2,276,000 | Stumpf | Mar. 10, 1942 |
| 2,284,251 | Boll | May 26, 1942 |
| 2,317,957 | Frudden | Apr. 27, 1943 |
| 2,448,662 | Dale | Sept. 7, 1948 |
| 2,448,822 | Pinardi | Sept. 7, 1948 |

Certificate of Correction

Patent No. 2,521,729                                                    September 12, 1950

BEVERLY W. KEESE

It is hereby certified that error appears in the printed specification of the above numbered patent requiring correction as follows:

Column 4, line 46, after "collar 132" insert the word *fixed*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*